US010340723B2

(12) United States Patent
Jung et al.

(10) Patent No.: US 10,340,723 B2
(45) Date of Patent: Jul. 2, 2019

(54) ELECTRONIC DEVICE AND METHOD FOR WIRELESS CHARGING IN ELECTRONIC DEVICE

(71) Applicant: Samsung Electronics Co., Ltd., Gyeonggi-do (KR)

(72) Inventors: Woo-Jin Jung, Gyeonggi-do (KR); Seung-Hyun Park, Seoul (KR); Jun-Hui Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 209 days.

(21) Appl. No.: 15/235,294

(22) Filed: Aug. 12, 2016

(65) Prior Publication Data

US 2017/0047765 A1 Feb. 16, 2017

(30) Foreign Application Priority Data

Aug. 13, 2015 (KR) .......................... 10-2015-0114959

(51) Int. Cl.
*H02J 7/00* (2006.01)
*H02J 7/02* (2016.01)
*H02J 50/10* (2016.01)
*H02J 50/90* (2016.01)

(52) U.S. Cl.
CPC ............ *H02J 7/025* (2013.01); *H02J 7/0044* (2013.01); *H02J 50/10* (2016.02); *H02J 50/90* (2016.02)

(58) Field of Classification Search
USPC ................................................... 320/109, 108
See application file for complete search history.

(56) References Cited

U.S. PATENT DOCUMENTS

| 5,889,384 | A | * | 3/1999 | Hayes | ..................... | H02J 7/025 |
| | | | | | | 320/108 |
| 6,341,218 | B1 | | 1/2002 | Poplawsky et al. | | |
| 7,729,803 | B2 | * | 6/2010 | Lim | ..................... | G05D 1/0225 |
| | | | | | | 180/167 |
| 8,234,509 | B2 | * | 7/2012 | Gioscia | ................. | G06F 1/1632 |
| | | | | | | 713/300 |
| 2008/0012528 | A1 | * | 1/2008 | Takaoka | ................. | A45D 27/46 |
| | | | | | | 320/115 |
| 2013/0300352 | A1 | * | 11/2013 | Kuk | ........................ | H02J 50/70 |
| | | | | | | 320/108 |
| 2014/0266005 | A1 | * | 9/2014 | Havass | .................. | H02J 7/0047 |
| | | | | | | 320/106 |
| 2016/0149432 | A1 | * | 5/2016 | Knepper | ................. | H02J 7/025 |
| | | | | | | 320/108 |

* cited by examiner

*Primary Examiner* — Samuel Berhanu
(74) *Attorney, Agent, or Firm* — Cha & Reiter, LLC

(57) ABSTRACT

An electronic device comprising: a sensing circuit configured to detect information relating to a mounting state of the electronic device when the electronic device is mounted on an external device; and a control circuit operatively coupled to the sensing circuit, configured to: detect the mounting state of the electronic device based on the information; and perform a charging operation based on the mounting state of the electronic device.

19 Claims, 11 Drawing Sheets

ELECTRONIC DEVICE AND METHOD FOR WIRELESS CHARGING IN ELECTRONIC DEVICE

CLAIM OF PRIORITY

This application claims the priority under 35 U.S.C. § 119(a) to Korean Application Serial No. 10-2015-0114959, which was filed in the Korean Intellectual Property Office on Aug. 13, 2015, the entire content of which is hereby incorporated by reference.

TECHNICAL FIELD

The present disclosure relates to electronic devices, in general, and more particularly to an electronic device and a method for wireless charging in the electronic device.

BACKGROUND

Mobile terminals, such as a mobile phone, a Personal Digital Assistant (PDA), etc., are driven with rechargeable batteries due to their nature, and the batteries of the mobile terminals are charged through supplied electric energy by using separate charging devices. Typically, the charging devices and the batteries have separate contact terminals on the exterior thereof, respectively, and are electrically connected with each other by contacting the contact terminals.

Recently, wireless charging or non-contact charging technologies have been developed to be used for many electronic devices.

In the wireless charging technologies using wireless power transmission and reception, when mobile phones are placed on charging pads, the batteries of the mobile phones can be charged without connecting to separate charging connectors. The wireless charging technologies have been employed for cordless electric toothbrushes, cordless electric shavers, etc. The wireless charging technologies can enhance a waterproof function by wirelessly charging electronic goods, can enhance the portability of electronic devices by excluding wired chargers, and can also be employed for electric vehicles.

When a wireless power receiver includes a display as an output device for delivering information to a user in a wireless charging system, the wireless power receiver may be mounted on a wireless power transmitter manufactured in a mounting type in order to deliver information to the user through the display even when receiving power from the wireless power transmitter.

SUMMARY

According to aspects of the disclosure, an electronic device is provided comprising: a sensing circuit configured to detect information relating to a mounting state of the electronic device when the electronic device is mounted on an external device; and a control circuit operatively coupled to the sensing circuit, configured to: detect the mounting state of the electronic device based on the information; and perform a charging operation based on the mounting state of the electronic device.

According to aspects of the disclosure, a method is provided for wireless charging of an electronic device, comprising: acquiring information relating to a mounting state of the electronic device when the electronic device is mounted on an external device; detecting the mounting state of the electronic device based on the information; and performing a charging operation based on the mounting state of the electronic device.

According to aspects of the disclosure, an electronic device is provided comprising: a housing including a part that is arranged to be received in a recess formed in an external wireless charging device; a conductive pattern disposed in the housing; a wireless charging circuit that is electrically coupled to the conductive pattern; at least one sensor configured to generate a sensor signal indicating a manner in which the electronic device is mounted in the recess of the external wireless charging device; and a control circuit configured to provide a first control signal to the wireless charging circuit based at least in part on the sensor signal, wherein the wireless charging circuit is configured to transmit, to the external wireless charging device, a second control signal for controlling the external wireless charging device, the second control signal being generated based on the first control signal.

According to aspects of the disclosure, an electronic device is provided comprising: a housing including a recess that is arranged to accommodate at least a part of an external electronic device; a conductive pattern disposed adjacently to a first surface of the recess that is oriented towards the external electronic device when the external electronic device is received in the recess; a wireless charging transmission circuit that is electrically coupled to the conductive pattern; an interface circuit that is electrically be coupled to the wireless charging transmission circuit; and a control circuit configured to receive a control signal from the external electronic device and cause the wireless charging transmission circuit to charge the external electronic device based on the control signal.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
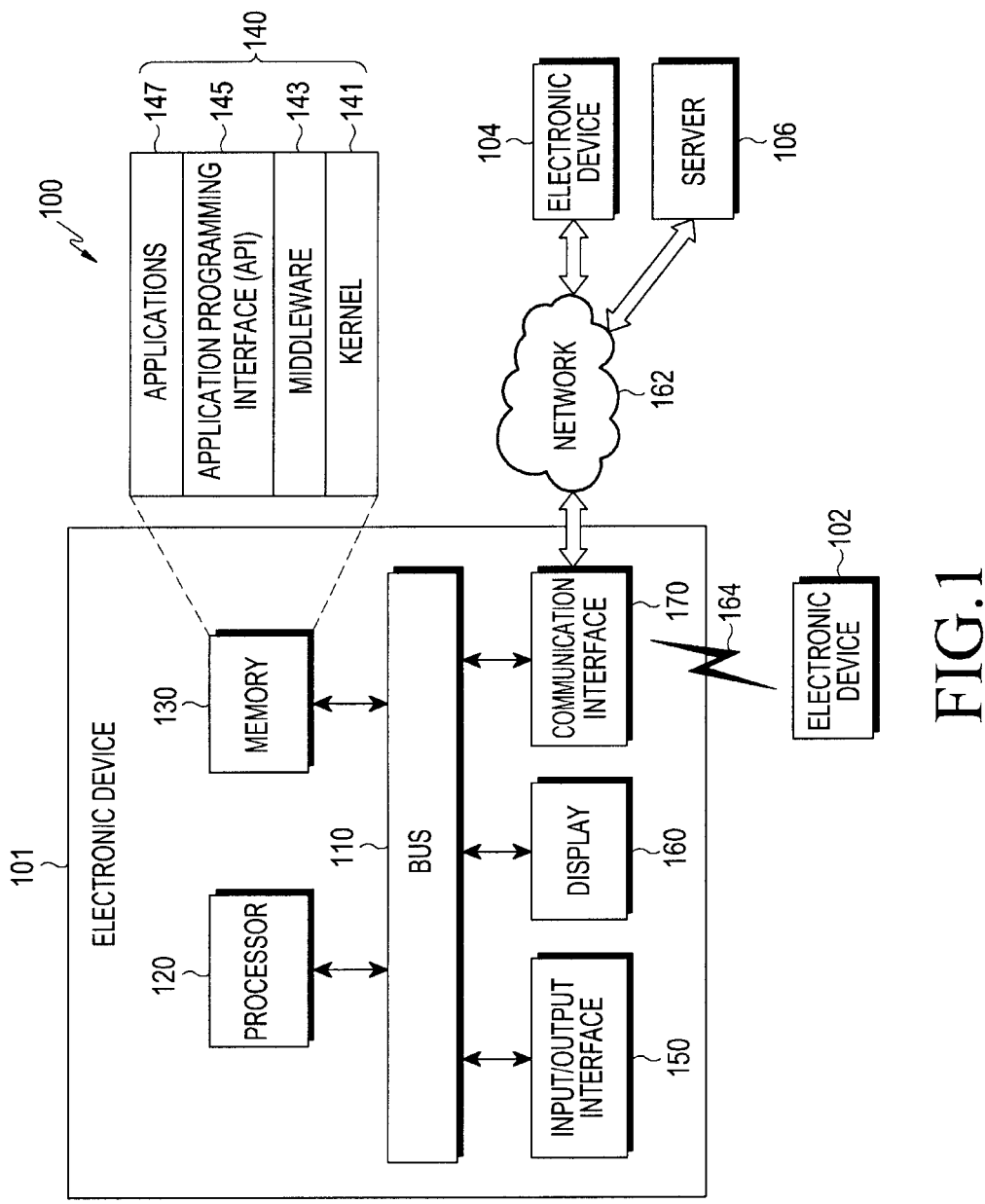
FIG. 1 is a diagram of an example of a network environment, according to an embodiment of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

In the present disclosure, the expression "have", "may have", "include" or "may include" refers to existence of a corresponding feature (e.g., numerical value, function, operation, or components such as elements), and does not exclude existence of additional features.

In the present disclosure, the expression "A or B", "at least one of A or/and B", or "one or more of A or/and B" may include all possible combinations of the items listed. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

An electronic device 101 within a network environment 100, according to various embodiments, will be described with reference to FIG. 1. The electronic device 101 may include a bus 110, a processor 120, a memory 130, an input/output interface 150, a display 160, and a communication interface 170. In some embodiments, the electronic device 101 may omit at least one of the elements, or may further include other elements.

The bus 110 may include, for example, a circuit that connects the elements 120, 130, and 150 to 170 and transfers communication (e.g., control messages and/or data) between the elements.

The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. For example, the processor 120 may carry out operations or data processing relating to the control and/or communication of at least one other element of the electronic device 101. The processor 120 may be referred to as a controller, or may include the controller as a part thereof, or may constitute the controller.

The memory 130 may include any suitable type of volatile or non-volatile memory, such as Random-access Memory (RAM), Read-Only Memory (ROM), Network Accessible Storage (NAS), cloud storage, a Solid State Drive (SSD), etc. The memory 130 may store, for example, instructions or data relating to at least one other element of the electronic device 101. According to an embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

For example, the kernel 141 may control or manage the system resources (e.g., the bus 110, the processor 120, the memory 130, etc.) that are used to execute operations or functions implemented in the other programs (e.g., the middleware 143, the API 145, and the application programs 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

Furthermore, the middleware 143 may process one or more task requests, which are received from the application programs 147, according to priorities thereof. For example, the middleware 143 may assign priorities for using the system resources (e.g., the bus 110, the processor 120, the memory 130, etc.) of the electronic device 101 to one or more of the application programs 147. For example, the middleware 143 may perform scheduling or loading balancing on the one or more task requests by processing the one or more task requests according to the priorities assigned to the one or more application programs.

The API 145, which is an interface through which the applications 147 control functions provided from the kernel 141 or the middleware 143, may include, for example, at least one interface or function (e.g., instruction) for file control, window control, image processing, text control, etc.

The input/output interface 150 may function as, for example, an interface that can forward instructions or data, which are input from a user or an external device, to the other element(s) of the electronic device 101. Furthermore, the input/output interface 150 may output instructions or data, which are received from the other element(s) of the electronic device 101, to the user or the external device.

Examples of the display 160 may include a Liquid Crystal Display (LCD), a Light-Emitting Diode (LED) display, an Organic Light-Emitting Diode (OLED) display, a Micro-ElectroMechanical Systems (MEMS) display, and an electronic paper display. The display 160 may display, for example, various types of contents (e.g., text, images, videos, icons, symbols, etc.) for a user. The display 160 may include a touch screen and may receive, for example, a touch, gesture, proximity, or hovering input using an electronic pen or the user's body part.

The communication interface 170 may configure communication, for example, between the electronic device 101 and an external device (e.g., a first external electronic device 102, a second external electronic device 104, or a server 106). For example, the communication interface 170 may be connected to a network 162 through wireless or wired communication to communicate with the external device (e.g., the second external electronic device 104 or the server 106). The communication interface 170 may include a Communication Processor (CP), and the communication processor may constitute one of a plurality of modules that constitute the communication interface 170. In one embodiment, the communication processor may also be included in the processor 120.

The wireless communication may use, for example, at least one of Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), Global System for Mobile Communications (GSM), and the like, as a cellular communication protocol. In addition, the wireless communication may include, for example, short range communication 164. The short range communication 164 may include, for example, at least one of WiFi, Bluetooth, Near Field Communication (NFC), Global Navigation Satellite System (GNSS), etc. The GNSS may include, for example, at least one of a Global Positioning System (GPS), a Global Navigation Satellite System (Glonass), a Beidou Navigation Satellite System (hereinafter, referred to as "Beidou"), and Galileo (the European global satellite-based navigation system) according to the place of usage or bandwidth thereof. Hereinafter, in the present disclosure, the term "GPS" may be interchangeably used with the term "GNSS". The wired communication may include, for example, at least one of a Universal Serial Bus (USB), a High Definition Multimedia Interface (HDMI), Recommended Standard 232 (RS-232), a Plain Old Telephone Service (POTS), etc. The network 162 may include a telecommunication network, for example, at least one of a computer network (e.g., a LAN or a WAN), the Internet, and a telephone network.

Each of the first and second external electronic devices 102 and 104 may be of the same or a different type from the electronic device 101. According to an embodiment, the server 106 may include a group of one or more servers. According to various embodiments, all or some of the operations executed in the electronic device 101 may be executed in another electronic device or a plurality of electronic devices (e.g., the electronic devices 102 and 104 or the server 106). According to an embodiment, when the electronic device 101 has to perform some functions or services automatically or in response to a request, the electronic device 101 may request another device (e.g., the electronic device 102 or 104 or the server 106) to perform at least some functions relating thereto instead of, or in addition to, performing the functions or services by itself. The other electronic device (e.g., the electronic device 102 or 104 or the server 106) may perform the requested functions or the additional functions and may transfer the execution result to the electronic device 101. The electronic device 101 may provide the received result as it is, or may additionally process the received result to provide the requested functions or services. To this end, for example, cloud computing, distributed computing, or client-server computing technology may be used.

Figure 2:
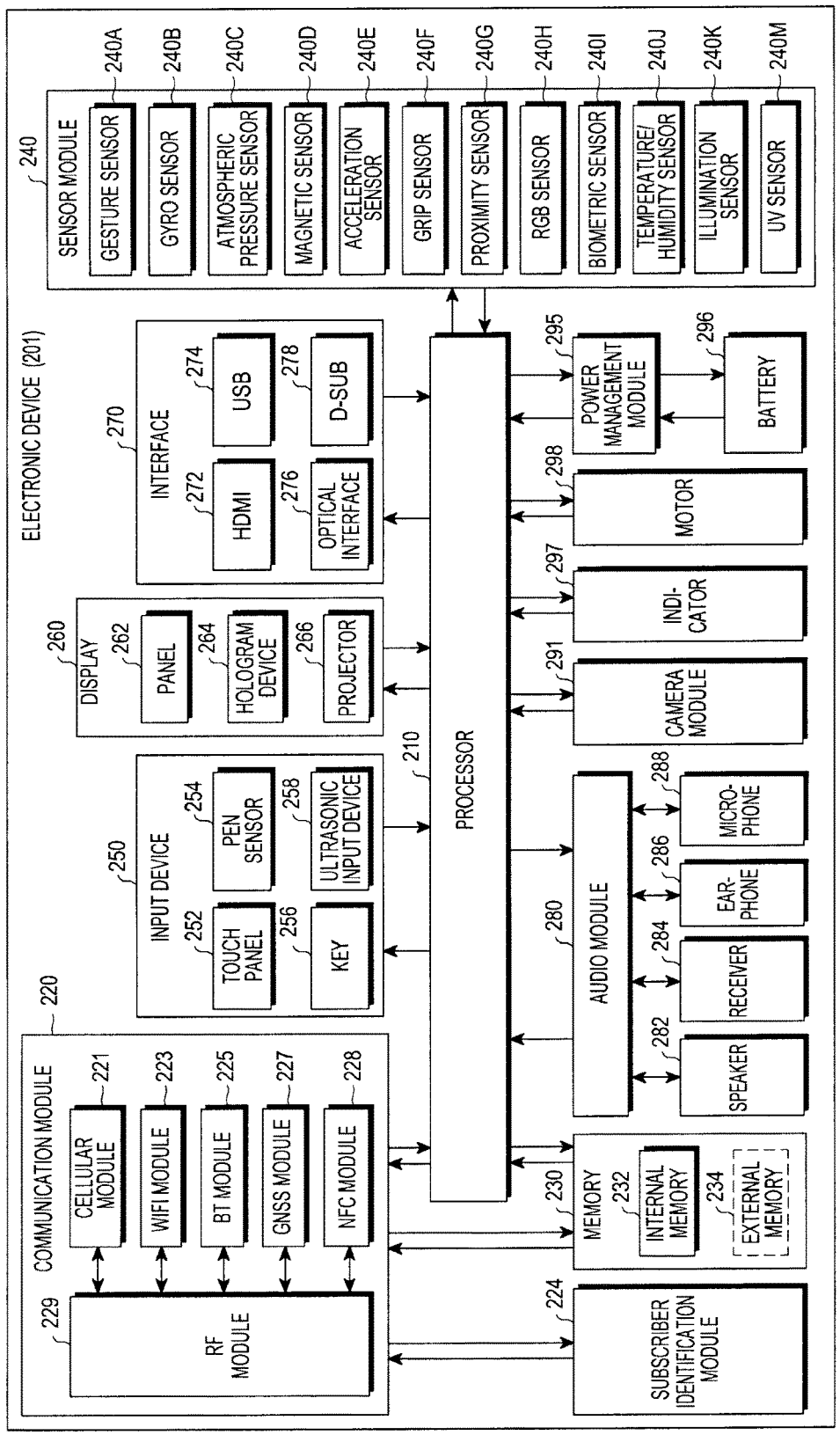
FIG. 2 is a block diagram of an example of an electronic device, according to an embodiment of the present disclosure.

FIG. 2 is a block diagram of an electronic device 201, according to various embodiments of the present disclosure. As illustrated, the electronic device 201 may include, for example, the entirety or a part of the electronic device 101 illustrated in FIG. 1. The electronic device 201 may include one or more processors 210 (e.g., Application Processors (APs)), a communication module 220, a memory 230, a sensor module 240, an input device 250, and a display 260. The electronic device 201 may further include at least one of a subscriber identification module 224, an interface 270, an audio module 280, a camera module 291, a power management module 295, a battery 296, an indicator 297, and a motor 298.

The processor 210 may drive, for example, an operating system or application programs to control a plurality of hardware or software elements connected thereto and may perform various types of data processing and operations. The processor 210 may be embodied, for example, as a System on Chip (SoC). According to an embodiment, the processor 210 may further include a Graphic Processing Unit (GPU) and/or an image signal processor. The processor 210 may also include at least some (e.g., a cellular module 221) of the elements illustrated in FIG. 2. The processor 210 may load, in a volatile memory, instructions or data received from at least one of the other elements (e.g., a non-volatile memory) to process the loaded instructions or data, and may store various types of data in the non-volatile memory.

The communication module 220 may have a configuration that is the same as, or similar to, that of the communication interface 170 illustrated in FIG. 1. The communication module 220 may include, for example, at least one of a cellular module 221, a WiFi module 223, a Bluetooth module 225, a GNSS module 227 (e.g., a GPS module, a Glonass module, a Beidou module, or a Galileo module), an NFC module 228, and a Radio Frequency (RF) module 229.

The cellular module 221 may provide, for example, a voice call, a video call, a text message service, an Internet service, etc. through a communication network. According to an embodiment, the cellular module 221 may identify and authenticate the electronic device 201 within a communication network using the subscriber identification module 224 (e.g., a SIM card). According to an embodiment, the cellular module 221 may perform at least some of the functions that the processor 210 may provide. According to an embodiment, the cellular module 221 may include a Communication Processor (CP).

The Wi-Fi module 223, the BT module 225, the GNSS module 227, or the NFC module 228 may include, for example, a processor for processing data that is transmitted and received through the corresponding module. According to some embodiments, at least some (two or more) of the cellular module 221, the WiFi module 223, the Bluetooth module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), an antenna, etc. According to another embodiment, at least one of the cellular module 221, the WiFi module 223, the BT module 225, the GNSS module 227, and the NFC module 228 may transmit/receive an RF signal through a separate RF module.

The subscriber identification module 224 may include, for example, a card that includes a subscriber identification module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an internal memory 232 or an external memory 234. The internal memory 232 may include, for example, at least one of a volatile memory (e.g., a Dynamic Random Access Memory (DRAM), a Static RAM (SRAM), a Synchronous Dynamic RAM (SDRAM), etc.) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory, a NOR flash memory, etc.), a hard disc drive, a Solid State Drive (SSD), etc.).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, etc. The external memory 234 may be functionally and/or physically connected to the electronic device 201 through various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H (e.g., a red, green, blue (RGB) sensor), a biometric sensor 240I, a temperature/humidity sensor 240J, an illumination sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments, the electronic device 201 may further include a processor configured to control the sensor module 240 as a part of, or separately from, the processor 210 and may control the sensor module 240 while the processor 210 is in a sleep state.

The input device 250 may include, for example, a touch panel 252. The input device 250 may further include at least one of a (digital) pen sensor 254, a key 256, an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user.

The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (e.g., a microphone 288) to identify data corresponding to the detected ultrasonic waves.

The display 260 (e.g., the display 160) may include a panel 262. The display 260 may further include a hologram device 264 and/or a projector 266. The panel 262 may have a configuration that is the same as, or similar to, that of the display 160 illustrated in FIG. 1. The panel 262 may be implemented to be, for example, flexible, transparent, or wearable. The panel 262, together with the touch panel 252, may be implemented as one module. The hologram device 264 may show a three-dimensional image in the air using an interference of light. The projector 266 may display an image by projecting light onto a screen. The screen may be located, for example, in the interior of, or on the exterior of, the electronic device 201. According to an embodiment, the display 260 may further include a control circuit for controlling the panel 262, the hologram device 264, or the projector 266.

The interface 270 may include, for example, at least one of a High-Definition Multimedia Interface (HDMI) 272, a Universal Serial Bus (USB) 274, an optical interface 276, and a D-subminiature (D-sub) 278. The interface 270 may be included, for example, in the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may, for example, convert a sound into an electrical signal, and vice versa. At least some elements of the audio module 280 may be included, for example, in the input/output interface 150 illustrated in FIG. 1. The audio module 280 may process sound information that is input or output through, for example, a speaker 282, a receiver 284, earphones 286, the microphone 288, etc.

The camera module 291 is a device that can photograph a still image and a moving image. According to an embodiment, the camera module 291 may include one or more image sensors (e.g., a front sensor or a rear sensor), a lens, an Image Signal Processor (ISP), or a flash (e.g., an LED or xenon lamp).

The power management module 295 may manage, for example, the power of the electronic device 201. According to an embodiment, the power management module 295 may include a Power Management Integrated Circuit (PMIC), a charger Integrated Circuit (IC), or a battery or fuel gauge. The PMIC may have a wired and/or wireless charging method. Examples of the wireless charging method may include a magnetic resonance method, a magnetic induction method, an electromagnetic wave method, etc. Additional circuits (e.g., a coil loop, a resonance circuit, a rectifier, etc.) for wireless charging may be further included. The battery gauge may measure, for example, the residual amount of the battery 296 and a voltage, current, or temperature while charging. The battery 296 may include, for example, a rechargeable battery and/or a solar battery.

The indicator 297 may indicate a particular state (e.g., a booting state, a message state, a charging state, etc.) of the electronic device 201 or a part (e.g., the processor 210) thereof. The motor 298 may convert an electrical signal into a mechanical vibration and may generate a vibration, a haptic effect, etc. Although not illustrated, the electronic device 201 may include a processing unit (e.g., a GPU) for supporting mobile TV. The processing unit for supporting mobile TV may process media data according to a standard, such as Digital Multimedia Broadcasting (DMB), Digital Video Broadcasting (DVB), mediaFlo™, etc.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
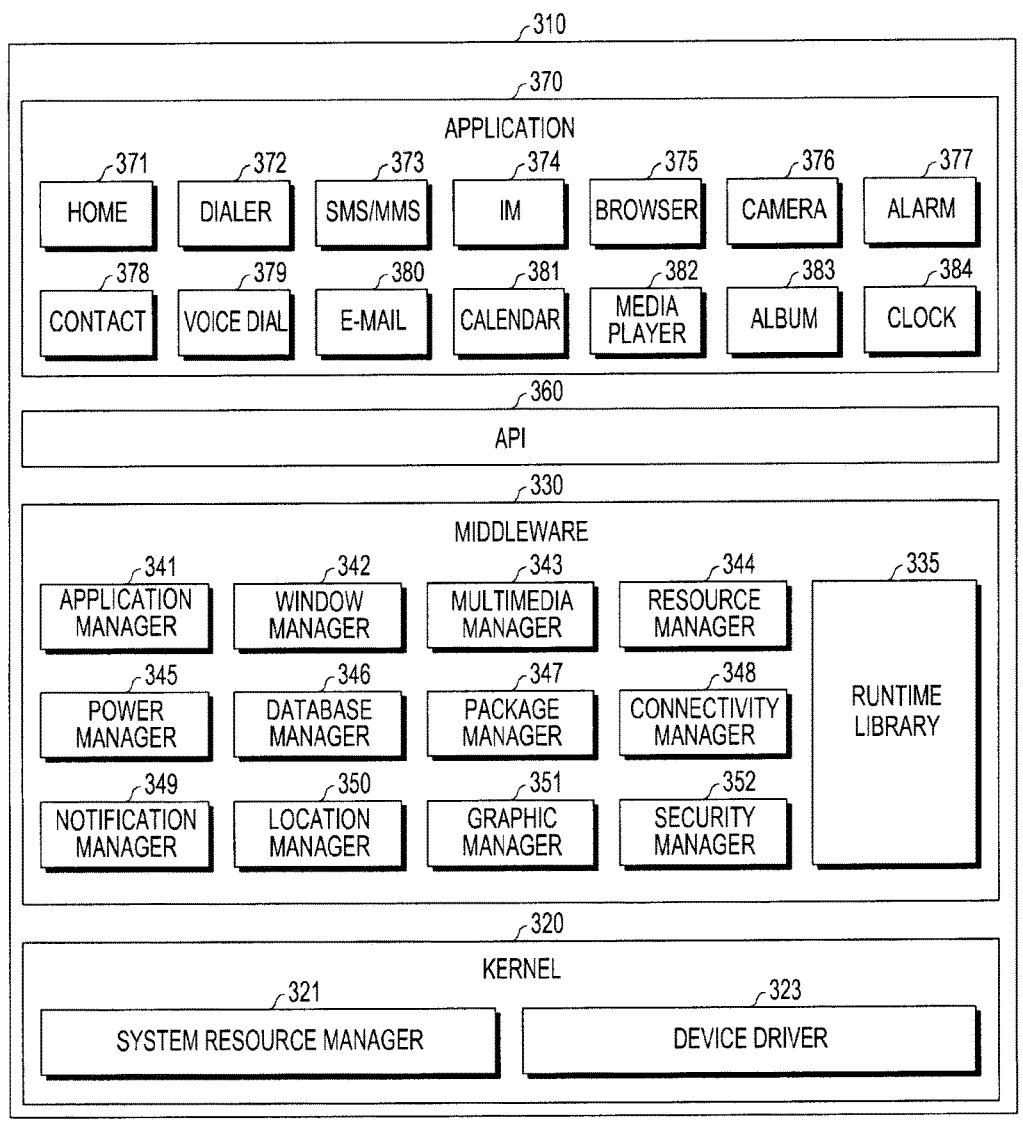
FIG. 3 is a block diagram of an example of a program module, according to an embodiment of the present disclosure.

FIG. 3 is a block diagram of an example of a program module, according to various embodiments of the present disclosure. According to an embodiment, the program module 310 (e.g., the program 140) may include an Operating System (OS) that controls resources relating to an electronic device (e.g., the electronic device 101) and/or various applications (e.g., the application programs 147) that are executed in the operating system. The operating system may be, for example, Android, iOS, Windows, Symbian, Tizen, Bada, etc.

The program module 310 may include a kernel 320, middleware 330, an Application Programming Interface (API) 360, and/or applications 370. At least a part of the program module 310 may be preloaded on the electronic device, or may be downloaded from an external electronic device (e.g., the electronic device 102 or 104 or the server 106).

The kernel 320 (e.g., the kernel 141) may include, for example, a system resource manager 321 and/or a device driver 323. The system resource manager 321 may control, allocate, or retrieve system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a WiFi driver, an audio driver, or an Inter-Process Communication (IPC) driver.

The middleware 330 may provide a function required by the applications 370 in common, or may provide various functions to the applications 370 through the API 360 such that the applications 370 can efficiently use limited system resources within the electronic device. According to an embodiment, the middleware 330 (e.g., the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may perform input/output management, memory management, the functionality for an arithmetic function, etc.

The application manager 341 may manage, for example, the life cycle of at least one of the applications 370. The window manager 342 may manage Graphical User Interface (GUI) resources used on a screen. The multimedia manager 343 may determine formats required to reproduce various media files and may encode or decode a media file using a coder/decoder (codec) appropriate for the corresponding format. The resource manager 344 may manage resources, such as the source code, the memory, the storage space, and the like of at least one of the applications 370.

The power manager 345 may operate together with, for example, a Basic Input/Output System (BIOS) to manage a battery or power and provide power information required for the operation of the electronic device. The database manager 346 may generate, search, and/or change a database to be used by at least one of the applications 370. The package manager 347 may manage the installation or update of an application that is distributed in the form of a package file.

The connectivity manager 348 may manage a wireless connection, such as Wi-Fi, Bluetooth, etc. The notification manager 349 may display or notify of an event, such as an arrival message, an appointment, a proximity notification, etc., in such a manner as not to disturb a user. The location manager 350 may manage the location information of the electronic device. The graphic manager 351 may manage a graphic effect to be provided to a user and a user interface relating to the graphic effect. The security manager 352 may provide various security functions required for system security, user authentication, etc. According to an embodiment, in a case where the electronic device (e.g., the electronic device 101) has a telephone call function, the middleware 330 may further include a telephony manager for managing a voice or video call function of the electronic device.

The middleware 330 may include a middleware module that forms a combination of various functions of the above-described elements. The middleware 330 may provide specialized modules according to the types of operating systems in order to provide differentiated functions. Furthermore, the middleware 330 may dynamically remove some of the existing elements, or may add new elements.

The API 360 (e.g., the API 145) is, for example, a set of API programming functions, and may be provided with different configurations according to operating systems. For example, in the case of Android or iOS, one API set may be provided for each platform, and in the case of Tizen, two or more API sets may be provided for each platform.

The applications 370 (e.g., the application programs 147) may include one or more applications that can perform functions, for example, home 371, dialer 372, SMS/MMS 373, Instant Message (IM) 374, browser 375, camera 376, alarm 377, contacts 378, voice dial 379, e-mail 380, calendar 381, media player 382, album 383, clock 384, health care (e.g., measuring exercise quantity or blood sugar), and environment information (e.g., atmospheric pressure, humidity, temperature information, etc.).

According to an embodiment, the applications 370 may include an application (hereinafter, referred to as an "information exchange application" for convenience of description) that supports information exchange between the electronic device (e.g., the electronic device 101) and an external electronic device (e.g., the electronic device 102 or 104). The information exchange application may include, for example, a notification relay application for forwarding specific information to the external electronic device or a device management application for managing the external electronic device.

For example, the notification relay application may include a function of transferring, to the external electronic device (e.g., the electronic device 102 or 104), notification information that is generated from the other applications (e.g., the SMS/MMS application, the e-mail application, the health care application, the environmental information application, etc.) of the electronic device. Furthermore, the notification relay application may, for example, receive notification information from the external electronic device and may provide the received notification information to a user.

The device management application may manage (e.g., install, delete, or update), for example, at least one function of an external electronic device (e.g., the electronic device 102 or 104) that communicates with the electronic device (e.g., a function of turning on/off the external electronic device itself (or some components thereof) or a function of adjusting the brightness (or resolution) of a display), applications that operate in the external electronic device, or services (e.g., a call service, a message service, etc.) that are provided by the external electronic device.

According to an embodiment, the applications 370 may include applications (e.g., a health care application of a mobile medical appliance, etc.) that are specified according to attributes of an external electronic device (e.g., the electronic device 102 or 104). According to an embodiment, the applications 370 may include applications that are received from an external electronic device (e.g., the server 106, or the electronic device 102 or 104). According to an embodiment, the applications 370 may include preloaded applications or third-party applications that can be downloaded from a server. Names of the elements of the program module 310, according to the above-described embodiments of the present disclosure, may change depending on the type of OS.

According to various exemplary embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

Figure 4A:
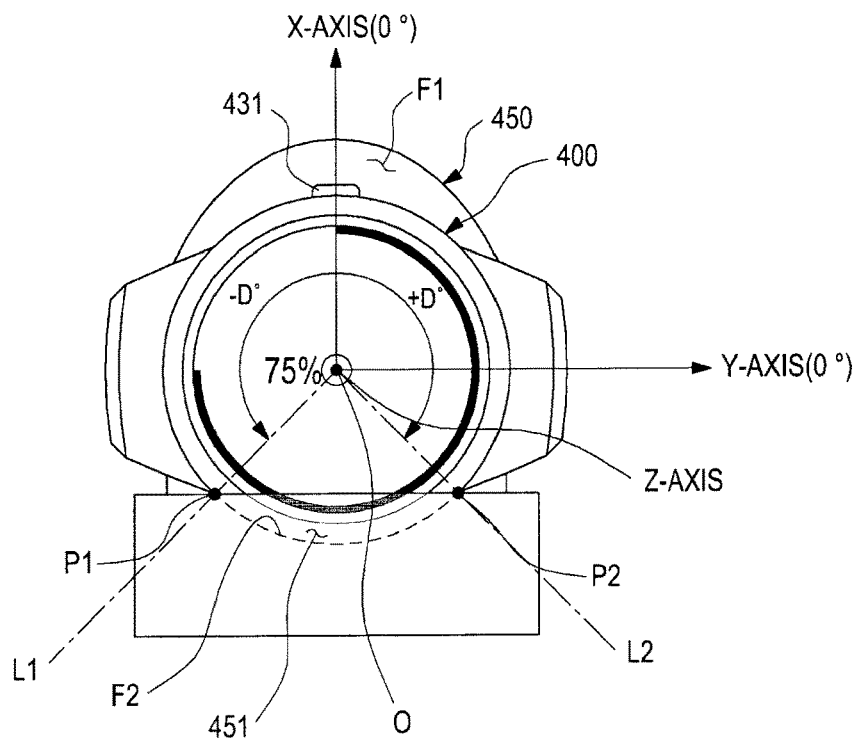
FIG. 4A is a front perspective view of an example of a wireless charging system, according to an embodiment of the present disclosure.
Figure 4B:
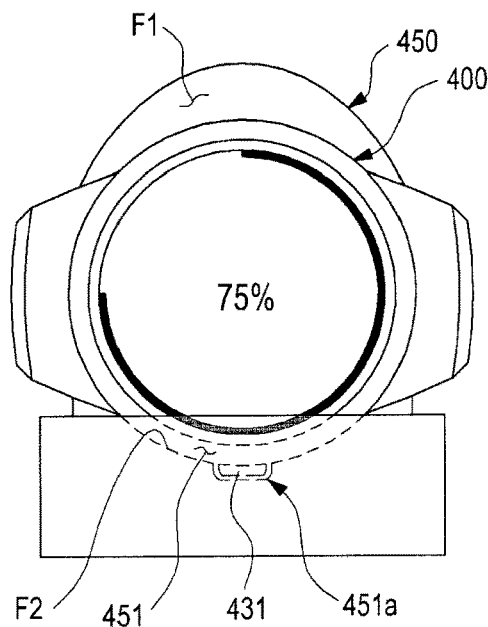
FIG. 4B is a front perspective view of an example of a wireless charging system, according to an embodiment of the present disclosure.
Figure 4C:
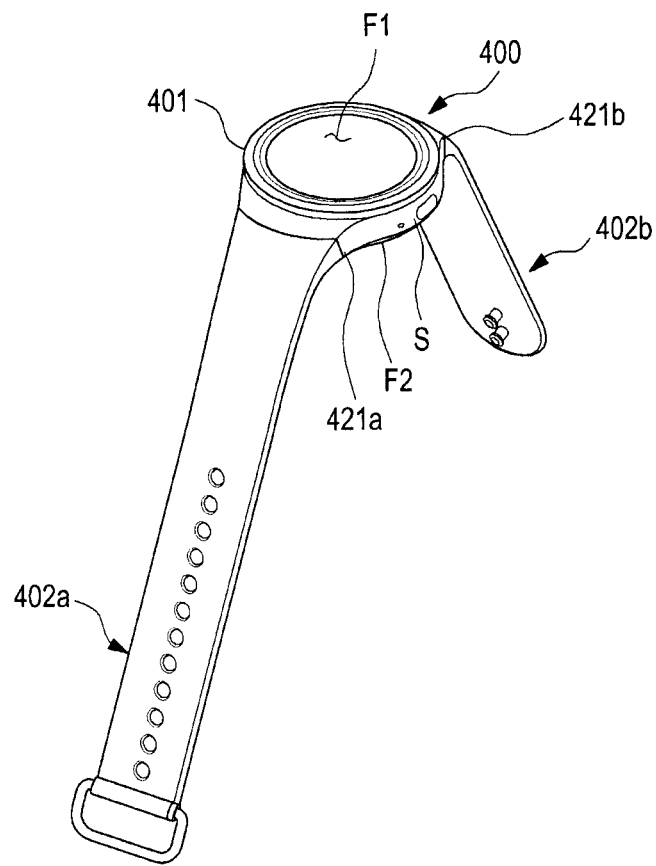
FIG. 4C is a diagram of an example of an electronic device, according to an embodiment of the present disclosure.
Figure 4D:
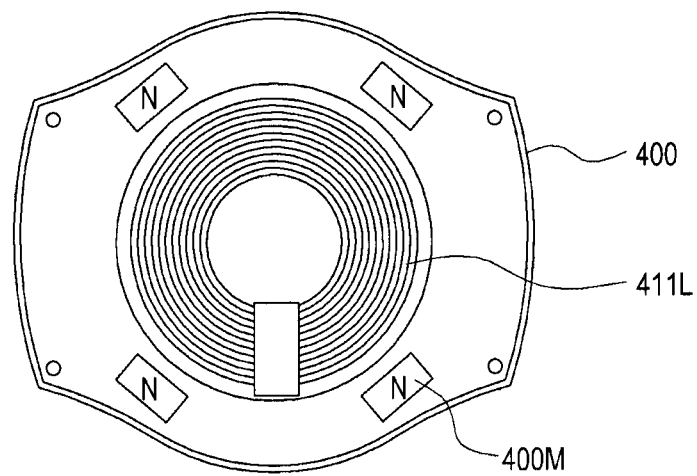
FIG. 4D is a diagram illustrating the internal configuration of the electronic device of FIG. 4C, according to an embodiment of the present disclosure.
Figure 4E:
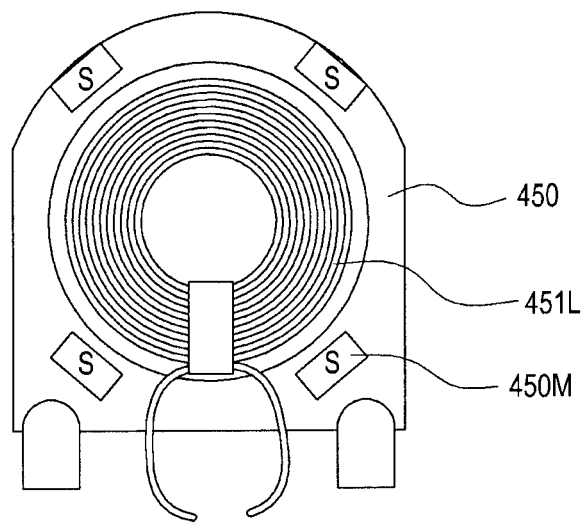
FIG. 4E is a diagram illustrating the internal configuration of an external electronic device, according to an embodiment of the present disclosure.

FIGS. 4A and 4B are front perspective views of a wireless charging system, according to an embodiment of the present disclosure. FIG. 4C is a diagram of an example of an electronic device, according to an embodiment of the present disclosure. FIG. 4D is a diagram illustrating the internal configuration of the electronic device of FIG. 4C, according to an embodiment of the present disclosure. FIG. 4E is a diagram illustrating the internal configuration of an external electronic device, according to an embodiment of the present disclosure. The wireless charging system according to the embodiment of the present disclosure, which is illustrated in FIGS. 4A to 4E, may include the electronic device 400 (e.g., a wireless power receiver) that receives power in a wireless manner and the external electronic device 450 (e.g., a wireless power transmitter) that transmits power in a wired manner. The electronic device 400 may include at least a part of the electronic device 101 illustrated in FIG. 1 or the electronic device 201 illustrated in FIG. 2. The external electronic device 450 may include at least a part of the electronic devices 102 and 104 illustrated in FIG. 1.

Referring to FIG. 4A, the electronic device 400 may be mounted in a mounting portion 451 (e.g., a recess) formed in the external electronic device 450 for wireless charging. When the electronic device 400 is mounted in the mounting portion 451, at least a part of the outer surface of the electronic device 400 may come in contact with a mounting surface F2 of the mounting portion 451. A protrusion 431 may be formed on at least a part of the outer surface of the electronic device 400 that comes in contact with the mounting surface F2. The protrusion 431 may be a button type of input device. For example, when the electronic device 400 is mounted on the external electronic device 450 for wireless charging, if the protrusion 431 comes in contact with the mounting surface F2, wireless charging efficiency may deteriorate due to the misalignment between a conductive pattern 411L (see FIG. 4D) of the electronic device 400 and a conductive pattern 451L (see FIG. 4E) of the external electronic device 450. When the wireless charging efficiency is deteriorated, the external electronic device 450 may increase power to be transmitted to the electronic device 400 for wireless charging. Accordingly, a large amount of heat may be generated during the wireless charging between the electronic device 400 and the external electronic device 450 such that the surface temperatures and the inner temperatures of the two devices may increase.

Accordingly, in order to prevent the misalignment between the conductive pattern 411L of the electronic device 400 and the conductive pattern 451L of the external electronic device 450, the electronic device 400 may determine its mounting state in order to determine whether to perform wireless charging when the electronic device 400 is mounted on the external electronic device 450. For example, determining the mounting state of the electronic device may include detecting whether the electronic device is in a normal mounting state or an abnormal mounting state.

According to an embodiment, when being mounted on the external electronic device 450, the electronic device 400 may determine whether it is in a normal mounting state based on the mounting angle of the electronic device 400. For example, the electronic device 400 may set a rechargeable reference mounting angle in advance. The preset reference mounting angle may be set to an angle by which the protrusion 431 of the electronic device 400 is not seated on the mounting surface F2 of the external electronic device 450. For example, the mounting angle of the electronic device 400 may be the angle between an axis of the electronic device and a reference plane when the electronic device 400 is mounted on an external electronic device 450, and it can be measured by using a gyro, an accelerometer, and/or other suitable type of device.

According to an embodiment, assuming that an axis (e.g., X-axis) of the electronic device 400 that coincides with the direction to which the protrusion 431 of the electronic device 400 extends is set as a reference axis, and opposite points at which the electronic device 400 comes in contact with the mounting surface F2 when being mounted on the mounting surface F2 are denoted by P1 and P2, first and second angles (−D° and D°) that first and second connecting lines L1 and L2, which connect the center of the electronic device 400 and the opposite points P1 and P2, make with the reference axis (X-axis) may be set as rechargeable reference mounting angles. The electronic device 400 may set a reference mounting angle range (e.g., between −D° and +D°) based on the first reference mounting angle (−D°) and the second reference mounting angle (+D°).

In this case, the electronic device 400 may detect the angle of the preset reference axis (X-axis) through a sensor (e.g., the sensor module 240) when the electronic device 400 is mounted on the external electronic device 450. When the detected angle matches the preset reference mounting angles, the electronic device 400 may determine that it is in a normal mounting state. Further, when the detected angle does not match the preset reference mounting angles, the electronic device 400 may determine that it is in an abnormal mounting state. For example, the detected angle may match the present reference mounting angles when the detected angle is equal to one of the preset reference mounting angles or is within a predetermined distance from that preset reference mounting angle Referring to FIG. 4B, the external electronic device 450 may further include a recess 451a that is formed in at least a part of the mounting surface F2. The protrusion 431 of the electronic device 400 may be inserted into the recess 451a. A push button switch type of sensor may be formed in the recess 451a. When the protrusion 431 of the electronic device 400 is inserted into the recess 451a, the electronic device 400 may determine the mounting state thereof to be a normal mounting state. For example, when the protrusion 431 is inserted into the recess 451a, the push button switch may be pressed, and turned on as a result. When the protrusion 431 is not inserted into the recess 451a, the push button switch may remain undisturbed.

According to an embodiment, the external electronic device 450 may detect the state of the push button switch, which is formed in the recess 451a, to determine whether the protrusion 431 is inserted into the recess 451a.

For example, the external electronic device 450 may transmit, to the electronic device 400, switch operation information based on an on signal and an off signal from the push button switch.

According to an embodiment, the electronic device 400 may determine whether its mounting state corresponds to a normal mounting state based on switching control information relating to the on/off signals of the push button switch that are received from the external electronic device 450.

For example, when the electronic device 400 receives, from the external electronic device 450, the switching control signal that includes a first signal that is generated as a result of the push button switch being pressed, the electronic device 400 may determine that it is in a normal mounting state. Further, when the electronic device 400 receives, from the external electronic device 450, the switching control signal that includes a second signal that indicates that the push button switch has not been pressed and/or lacks the first signal, the electronic device 400 may determine that it is in a non-rechargeable state.

Referring to FIG. 4C, the electronic device 400, according to the present disclosure, may include a housing 401 and coupling member(s) 402a and 402b provided on the housing 401. The coupling members 402a and 402b may be detachably coupled to the housing 401 and may be used to wear the electronic device 400 (for example, the housing 401) on a user's body.

The housing 401 may have a shape that is arranged to be detachably mounted in the mounting portion 451 formed in the external electronic device 450, and may include a first surface F1 having a substantially circular shape, a second surface F2 opposite to the first surface F1, and a side surface S that closes off, at least partially, the space between the first surface F1 and the second surface F2. The conductive pattern 411L may be disposed inside the housing 401 so as to be close to at least a part of the second surface F2 and the side surface S of the housing 401. The housing 401 may further include the protrusion 431 extending from the side surface S. The housing 401 may include the first coupling member 402a that is connected to a first portion 421a of the side surface S and is configured to be coupled to a user's body part and the second coupling member 402b that is connected to a second portion 421b of the side surface S and is configured to be coupled to the user's body part together with the first portion 421a. The protrusion 431 may be located on the side surface S of the housing 401 between the first portion 421a and the second portion 421b.

The housing 401 may include a wireless charging circuit (e.g., a power reception circuit) electrically connected to the conductive pattern 411L, a battery, at least one sensor, a control circuit, etc. The at least one sensor may generate information indicating the manner in which the housing 401 of the electronic device 400 is mounted in the mounting portion 451 of the external electronic device 450 (e.g., power transmitter). The control circuit may provide a first control signal to the wireless charging circuit at least partially based on the information generated by the at least one sensor. Based on the first control signal, the wireless charging circuit may transmit, to the external electronic device 450, a second control signal to control the external electronic device 450. The at least one sensor may include at least one of a gyro sensor, an acceleration sensor, a Hall-effect sensor, an optical sensor, and a proximity sensor.

The housing 401 may include a member (e.g., a magnetic element 400M (see FIG. 4D)), which is attracted by at least one magnetic member or magnet, on the exterior of, or in the interior of, the housing 401 so as to be adjacent to a surface that extends toward the mounting portion 451 of the external electronic device 450 when the electronic device 400 is mounted on the external electronic device 450.

According to aspects of the disclosure, the external electronic device 450 may include a housing that has the mounting portion 451 (e.g., recess) in which the electronic device 400 (e.g., power receiver) can be accommodated. The housing may include: a first surface F1 that is formed to face at least a part of the electronic device 400 (e.g., the second surface F2 of the electronic device 400) when the electronic device 400 is mounted on the external electronic device; and the mounting surface F2 that is substantially perpendicular to the first surface F1. The first surface F1 may be inclined at a selected angle with respect to the horizontal plane. The recess (e.g., the mounting portion 451) may include the mounting surface F2, and the mounting surface F2 may include a curved surface. The curved surface may have a shape other than a closed curve when viewed from a viewpoint above the first surface F1.

The housing may include: the conductive pattern 451L (see FIG. 4E) disposed inside the housing so as to be adjacent to a first surface F1 of the mounting portion 451 that is directed toward at least a part of the electronic device 400; a wireless charging transmission circuit (e.g., a power transmission circuit) electrically connected to the conductive pattern 451L; an interface circuit (e.g., a power adaptor) that is electrically connected to the wireless charging transmission circuit and may be connected to an external power source; and a control circuit configured to receive a control signal from the electronic device 400 and control the operation of the wireless charging transmission circuit based on the control signal. Referring to FIGS. 4D and 4E, the conductive patterns 411L and 451L that correspond to each other may be disposed in the electronic device 400 and the external electronic device 450, respectively. One or more magnetic elements 400M and 450M may be formed to correspond to each other in order to align the conductive patterns 411L and 451L such that the conductive patterns 411L and 451L have a normal charging efficiency. The one or more magnetic elements 400M and 450M may be disposed to have opposite polarities so that the conductive coils 411L and 451L can be aligned in a position corresponding to a normal charging efficiency while charging wirelessly. The operation of the electronic device 400 and the external electronic device 450 will be described below in more detail.

Figure 5:
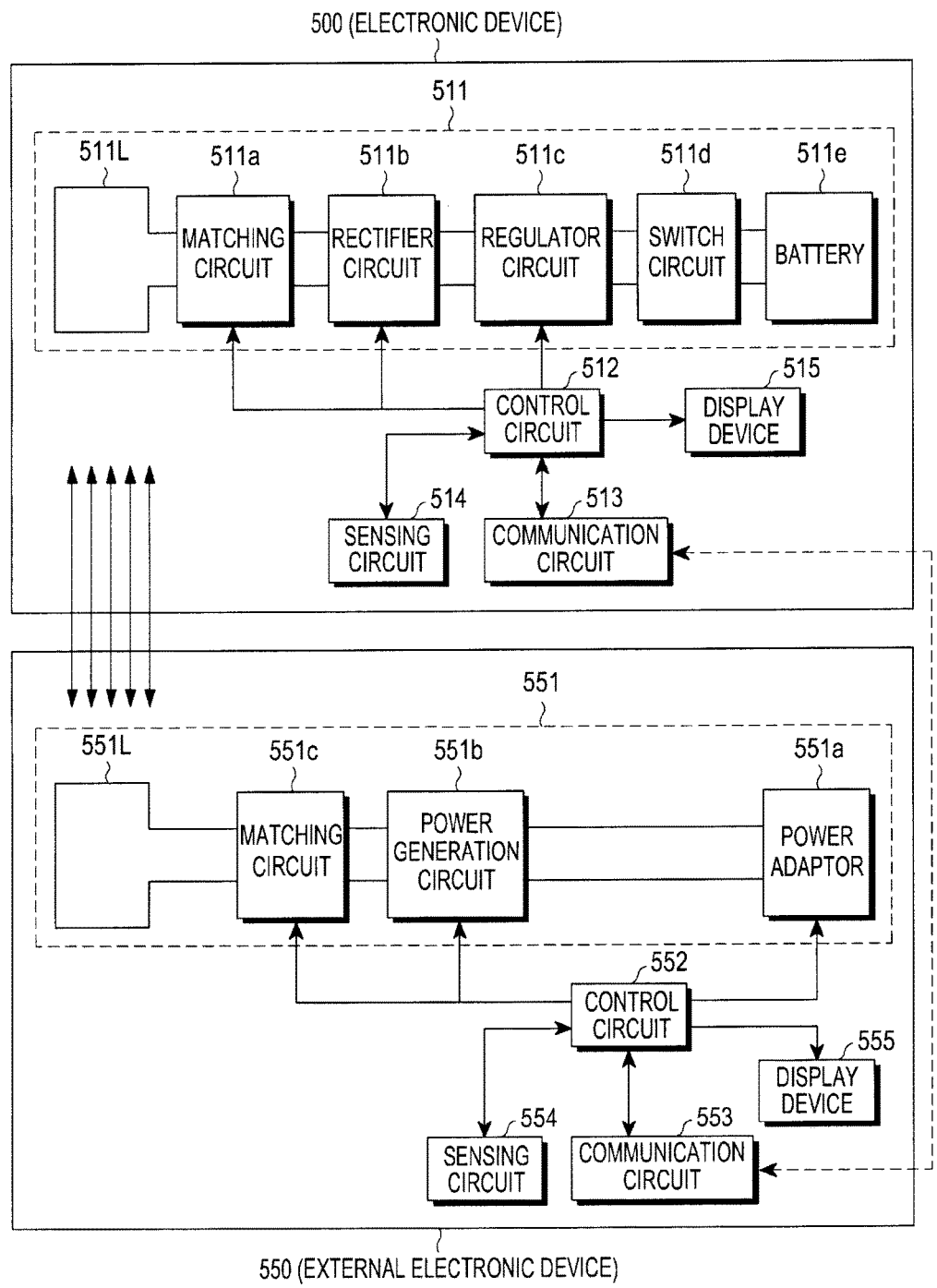
FIG. 5 is a block diagram of an example of a wireless charging system, according to an embodiment of the present disclosure.

FIG. 5 is a block diagram of an example of a wireless charging system, according to an embodiment of the present disclosure. Referring to FIG. 5, the wireless charging system, according to the embodiment of the present disclosure, may include an electronic device 500 (e.g., a wireless power receiver) that receives power in a wireless manner and an external electronic device 550 (e.g., a wireless power transmitter) that transmits power in a wired manner. The electronic device 500 may include at least a portion of the electronic device 101 illustrated in FIG. 1, the electronic device 201 illustrated in FIG. 2, or the electronic device 400 illustrated in FIG. 4. The external electronic device 550 may include at least a portion of the electronic devices 102 and 104 illustrated in FIG. 1 or the external electronic device 450 illustrated in FIG. 4.

The electronic device 500, according to an embodiment of the present disclosure, may include a power reception circuit 511, a control circuit 512, a communication circuit 513, a sensing circuit 514, and a display device 515, each of which may be disposed inside a housing. The external electronic device 550 may include a power transmission circuit 551, a control circuit 552, a communication circuit 553, a sensing circuit 554, and a display device 555, each of which may be disposed inside a housing.

The power reception circuit 511 of the electronic device 500, according to the embodiment of the present disclosure, may receive power from the power transmission circuit 551 of the external electronic device 550. The power reception circuit 511 may include an embedded battery and/or a power reception interface to receive power from the outside. The power reception circuit 511 may include a conductive pattern 511L. The power reception circuit 511 may receive, through the conductive coil 511L, an electromagnetic waveform that is generated in response to a current/voltage being applied to a conductive coil 551L of the power transmission circuit 551. For example, the power reception circuit 511 may receive, from the power transmission circuit 551, power that an AC waveform of power applied to the conductive coil 551L of the power transmission circuit 551 supplies to the adjacent conductive coil 511L of the power reception circuit 511 by generating an induced electromotive force.

The power reception circuit 511 may include, for example, the conductive coil 511L formed of a conductive pattern, and may further include at least one of a matching circuit 511a, a rectifier circuit 511b, a regulator circuit 511c, a switch circuit 511d, and a battery 511e, in addition to the conductive coil 511L.

The matching circuit 511a may perform impedance matching. For example, the power transmitted through the conductive coil 551L of the external electronic device 550 may be transferred to the conductive coil 511L to generate an electromagnetic field. In this case, the matching circuit 511a may regulate the frequency band of the generated electromagnetic field signal to regulate impedance viewed from the matching circuit 511a. The matching circuit 511a may cause input power received from the electronic device 500 through the conductive coil 511L to have high efficiency and high power by the regulation of impedance. The matching circuit 511a may regulate impedance based on the control of the control circuit 512. The matching circuit 511a may include at least one of an inductor (e.g., a coil), a capacitor, and a switch device. The control circuit 512 may control the connection state with at least one of the inductor and the capacitor through the switch device and may perform impedance matching accordingly.

The rectifier circuit 511a may rectify signal received by the conductive coil 511L in a DC form and may be implemented, for example, by using a diode bridge.

The regulator circuit 511c may adjust the gain of the rectified signal. The regulator circuit 511c may include a DC/DC converter (not illustrated). For example, the regulator circuit 511c may convert the rectified signal in such a manner that the output end thereof has a voltage of 5 V. In some implementations, the minimum and maximum values of an applicable voltage may be set in advance at the front end of the regulator circuit 511c.

The switch circuit 511d may connect the regulator circuit 511c and the battery 511e. The switch circuit 511c may be turned on and off by the control circuit 512.

The battery 511e may be supplied with the power input from the regulator circuit 511c when the switch circuit 511d is in an on state.

The communication circuit 513 (e.g., the communication interface 170 or the communication module 220) may communicate with the external electronic device 550 in accordance with a predetermined protocol. The communication circuit 513 may exchange data with the communication circuit 553 of the external electronic device 550. For example, the communication circuit 513 may transmit a charging end signal for controlling to end the power transmission of the external electronic device 550 based on the mounting state of the electronic device 500. The communication circuit 513 may also receive information relating to the mounting state of the electronic device 500 from the external electronic device 550. In addition, the communication circuit 513 may receive a signal containing information associated with the external electronic device 550. Here, the communication circuit 513 may unicast, multicast, or broadcast the signal.

The communication circuit 513 may communicate with the communication circuit 553 of the external electronic device 550 using Near Field Communication (NFC), Zigbee communication, infrared communication, visible light communication, Bluetooth communication, Bluetooth Low Energy (BLE) scheme, and/or any other suitable type of communications protocol.

Although it is illustrated in FIG. 5 that the communication circuit 513 is separate from the power reception circuit 511 so that the electronic device 500 performs communication in an out-of-band format, this is provided only as an example. In the present disclosure, the power reception circuit 511 and the communication circuit 513 may be integrated together so that the electronic device 500 may also perform communication in an in-band format.

The communication circuit 513 may also receive/transmit a signal from/to another wireless power transmission device (not illustrated), as well as the external electronic device 550.

The above-described communication schemes are merely illustrative, and the scope of the embodiments of the present disclosure is not limited to a specific communication scheme that is performed by the communication circuit 413.

The sensing circuit 514 (e.g., the sensor module 240 of the electronic device 201) may detect information relating to the mounting state of the electronic device 500 that is mounted in a mounting portion (e.g., the mounting portion 451) of the external electronic device 550. For example, the sensing circuit 514 may include an acceleration sensor (e.g., 6-axis acceleration sensor) or a gyro sensor that detects at least one of the posture and the mounting angle (direction) of the electronic device 500. The sensing circuit 514 may include one or more Hall sensors that detect the magnetic intensity of one or more magnetic elements (e.g., the magnetic element 400M) disposed within the electronic device 500.

The control circuit 512 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In some implementations, the control circuit 512 may control the overall operation of the electronic device 500 using an algorithm, program, or application required by control, which is stored in a storage device (e.g., the memory 130). The control circuit 512 may include a Central Processing Unit (CPU), a microprocessor, or a minicomputer.

When the electronic device 500 is mounted on the external electronic device 550 (e.g., the mounting portion 451), the control circuit 512 may determine whether the mounting state is a normal mounting state based on information relating to the mounting state of the electronic device 500 that is received by using the sensing circuit 514. The control circuit 512 may receive the information relating to the mounting state of the electronic device 500 from the external electronic device 550 through the communication circuit 513. The control circuit 512 may also determine whether the mounting state is a normal mounting state based on the received information. When the determination result shows that the mounting state is a normal mounting state, the control circuit 512 may receive power from the external electronic device 550 to perform charging of its battery. When the electronic device is in an abnormal charging state, the control circuit 512 may transmit a charging end signal to the external electronic device 550 to end charging.

In addition, the control circuit 512 may display an indication of the mounting state of the electronic device 500 on the display device 515 based on the determination result. For example, when the mounting state is a normal mounting state, the control circuit 512 may display, on the display device 515, visual data indicating that the electronic device 500 is being recharged. When the mounting state is an abnormal mounting state, the control circuit 512 may display visual data for representing that the mounting state is abnormal on the display device 515, or may output a sound (e.g., at least one of an alarm and an alert message) indicating that the mounting state is abnormal through an audio output device (e.g., the audio module 280 or the speaker 282). Furthermore, the control circuit 512 may also display the charging state information of the electronic device 500 on the display device 515. For example, the control circuit 512 may display, on the display device 515, at least one of the total battery capacity of the electronic device 500, the residual amount of battery capacity of the electronic device 500, the amount of charge of the battery, the amount of used battery, and the expected time until the charging is completed. The display device 515 may include a display (e.g., the display 260).

The detailed operation of the control circuit 512 will be described below in more detail.

According to aspects of the disclosure, the power transmission circuit 551 of the external electronic device 550 may provide power required by the electronic device 500 that tries to receive wireless power and may provide the power to the electronic device 500 in a wireless manner. For example, the power transmission circuit 551 may supply the power in an AC waveform to the electronic device 500. For example, the power transmission circuit 551 may be supplied with power in a DC or AC waveform from the outside, and when receiving a DC waveform of power, the power transmission circuit 551 may convert the DC waveform of power into an AC waveform of power using an inverter to supply the power in an AC waveform. The power transmission circuit 551 may include an embedded battery and/or a power reception interface to receive power from the outside and supply the power to other elements.

The power transmission circuit 551 may include, for example, the conductive coil 551L formed of a conductive pattern, and may further include at least one of a power adaptor 551a, a power generation circuit 551b, and a matching circuit 551c, in addition to the conductive coil 551L.

The power adaptor 551a may output DC power having a preset voltage value. The voltage of the DC power output from the power adaptor 551a may be controlled by the control circuit 552. AC or DC power output from the power adaptor 551a may be output to the power generation circuit 551b.

The power generation circuit 551b may convert the DC current input from the power adaptor 551a into an AC current and may output the AC current. The power generation circuit 551b may also include an amplifier (not illustrated), and when the DC current input through the power adaptor 551a has less than a preset gain, the power generation circuit 551b may amplify the DC current to the preset gain using the amplifier. In addition, the power generation circuit 551b may also convert the DC current input from the power adaptor 551a into an AC current based on a signal input from the control circuit 552. Accordingly, the power generation unit 551b may output the AC power.

The matching circuit 551c may perform impedance matching. For example, the matching circuit 551c may regulate impedance viewed therefrom to control output power to have high-efficiency and high-power. The matching circuit 551c may regulate impedance based on the control of the control circuit 552. The matching circuit 551c may include at least one of an inductor (e.g., a coil) and a capacitor. The control circuit 552 may control the connection state with at least one of the inductor and the capacitor and may perform impedance matching accordingly.

The power transmission circuit 551 is not limited thereto, and may include any suitable type of hardware that is capable of providing a predetermined AC waveform of power without limitation.

In addition, the power transmission circuit 551 may provide an AC waveform in the form of electromagnetic waves to the electronic device 500. An AC waveform of power applied to the conductive coil 551L of the power transmission circuit 551 may supply power to the adjacent conductive coil 511L of the power reception circuit 511 by generating an induced electromotive force. For example, when a current is applied to the conductive coil 551L, the power transmission circuit 551 may transmit an electromagnetic waveform of wireless power corresponding to the applied current to the conductive coil 511L of the power reception circuit 511. The power transmission circuit 551 may additionally include a resonance circuit, and when the power transmission circuit 551 is implemented as a resonance circuit, the inductance L of a conductive coil of the resonance coil may be changed. According to aspects of the disclosure, it will be easily understood by those skilled in the art that the power transmission circuit 551 may include any suitable type of hardware that is capable of transmitting and receiving electromagnetic waves without limitation.

The sensing circuit 554 may detect information relating to the mounting state of the electronic device 500 mounted on the external electronic device 550. For example, the sensing circuit 554 may detect whether a protrusion (e.g., the protrusion 431) of the electronic device 500 is inserted into a recess (e.g., the recess 451a) formed in a mounting portion (e.g., the mounting portion 451) of the external electronic device 550. For example, by using a push button switch type of sensor that is formed in the recess 451a, the sensing circuit 554 may detect on/off signals of the push button switch. The sensing circuit 554 may include one or more Hall sensors that detect the magnetic intensity of one or more magnetic elements (e.g., the magnetic element 450M) disposed within the external electronic device 550.

The control circuit 552 may control the overall operation of the external electronic device 550. The communication circuit 553 may communicate with the electronic device 500 in accordance with a predetermined protocol. In operation, the communication circuit 553 may receive, from the electronic device 500, a charging end signal for controlling to end the power transmission of the external electronic device 550. Furthermore, the communication circuit 553 may transmit, to the electronic device 500, information relating to the mounting state of the electronic device 500 that is detected by the sensing circuit 554. According to aspects of the disclosure, the communication unit 553 may unicast, multicast, or broadcast the signal.

Further, the communication circuit 553 may receive power information from the electronic device 500. Here, the power information may include at least one of an indication the (total) battery capacity of the electronic device 500, an indication of the residual amount of battery capacity of the electronic device 500, an indication of the number of times that the battery has been recharged, an indication of the amount of power that is provided by battery, and a battery ratio that represents a ratio of the residual capacity of the battery to the total battery capacity.

The communication circuit 553 may also receive a signal from another wireless power reception device (not illustrated), as well as the electronic device 500.

Although it is illustrated in FIG. 5 that the communication circuit 553 is separate from the power transmission circuit 551 so that the external electronic device 550 performs communication in an out-of-band format, this is provided only as an example. In the present disclosure, the power transmission circuit 551 and the communication circuit 553 may be integrated together so that the external electronic device 550 may also perform communication in an in-band format.

The electronic device 500 and the external electronic device 550 may transmit and receive various types of signals through the communication circuits 513 and 553, respectively.

According to various embodiments, an electronic device may include: a communication circuit that wirelessly receives power from an external electronic device on which the electronic device is mounted; a sensing circuit that detects information relating to the mounting state of the electronic device; and a control circuit configured to determine whether the mounting state corresponds to a normal mounting state based on the detected information and perform charging according to the determination result when the electronic device is mounted on the external electronic device.

According to various embodiments, the detected information may include the mounting angle of the electronic device.

According to various embodiments, the control circuit may determine the mounting state of the electronic device to be a normal mounting state when the detected mounting angle of the electronic device corresponds to a preset reference mounting angle.

According to various embodiments, the control circuit may receive the power from the external electronic device to perform charging when the mounting state of the electronic device corresponds to a normal mounting state.

According to various embodiments, the control circuit may determine the mounting state of the electronic device to be an abnormal mounting state when the detected mounting angle of the electronic device does not correspond to a preset reference mounting angle.

According to various embodiments, the control circuit may transmit a charging end signal to the external electronic device to end the charging when the mounting state of the electronic device corresponds to an abnormal mounting state.

According to various embodiments, the control circuit may inform that the mounting state of the electronic device corresponds to an abnormal mounting state when the mounting state of the electronic device corresponds to the abnormal mounting state.

According to various embodiments, the control circuit may limit the received power to power corresponding to a preset current value to perform charging when the mounting state of the electronic device corresponds to an abnormal mounting state.

According to various embodiments, the control circuit may determine whether the time detected when the mounting state of the electronic device is determined to be an abnormal mounting state corresponds to a preset time interval when the mounting state of the electronic device corresponds to the abnormal mounting state.

According to various embodiments, the control circuit may limit the received power to power corresponding to a preset current value to perform charging when the detected time corresponds to the preset time interval.

According to various embodiments, the control circuit may determine whether an abnormal mounting state is maintained when the mounting state of the electronic device corresponds to the abnormal mounting state.

According to various embodiments, the control circuit may limit the received power to power corresponding to a preset current value to perform charging when the abnormal mounting state is maintained.

According to various embodiments, an electronic device may include: a housing that includes at least a part having a shape that is detachably mounted in a recess formed in an external wireless charging device; a conductive pattern disposed inside the housing so as to be close to at least a part of the housing; a wireless charging circuit electrically connected to the conductive pattern; a rechargeable battery electrically connected to the wireless charging circuit; at least one sensor that generates information indicating the manner in which the housing of the electronic device is mounted in the recess of the external wireless charging device; and a control circuit that provides a first control signal to the wireless charging circuit based on at least a part of the information generated from the at least one sensor, wherein the wireless charging circuit may transmit, to the external wireless charging device, a second control signal for controlling the external wireless charging device based on the first control signal.

According to various embodiments, the at least one sensor may include at least one of a gyro sensor, an acceleration sensor, a Hall effect sensor, an optical sensor, and a proximity sensor.

According to various embodiments, the housing may include a material, which is attracted by at least one magnetic material or magnet, on the exterior of, or in the interior of, the housing so as to be adjacent to a surface of at least a part of the housing that is directed toward the recess of the external wireless charging device.

According to various embodiments, the housing may include a first surface having a substantially circular shape, a second surface opposite to the first surface, and a side surface that surrounds the space between the first surface and the second surface, and the second surface and at least a part of the side surface of the housing may form the at least a part of the housing.

According to various embodiments, the electronic device may further include a protrusion protruding from the side surface of the housing.

According to various embodiments, the electronic device may further include: a first coupling member connected to a first portion of the side surface of the housing and coupled to a user's body part; and a second coupling member connected to a second portion of the side surface of the housing and coupled to the user's body part together with the first portion, wherein the protrusion is located on the intermediate portion between the first portion and the second portion of the side surface of the housing.

According to various embodiments, an electronic device may include: an external housing that includes a recess that is formed to accommodate at least a part of a housing of an external electronic device that wirelessly receives power; a conductive pattern disposed inside the external housing so as to be adjacent to a first surface of the recess that is directed toward at least a part of the external electronic device; a wireless charging transmission circuit electrically connected to the conductive pattern; an interface circuit that is electrically connected to the wireless charging transmission circuit and is capable of being connected to an external power source; and a control circuit configured to receive a control signal from the external electronic device and control the operation of the wireless charging transmission circuit based on the control signal.

According to various embodiments, the first surface directed toward at least a part of the external electronic device may be inclined at a selected angle with respect to the horizontal plane.

According to various embodiments, the recess may further include a second surface that is substantially perpendicular to the first surface.

According to various embodiments, the second surface may include a curved surface.

According to various embodiments, the curved surface may have a shape other than a closed curve when viewed from a viewpoint above the first surface.

Figure 6:
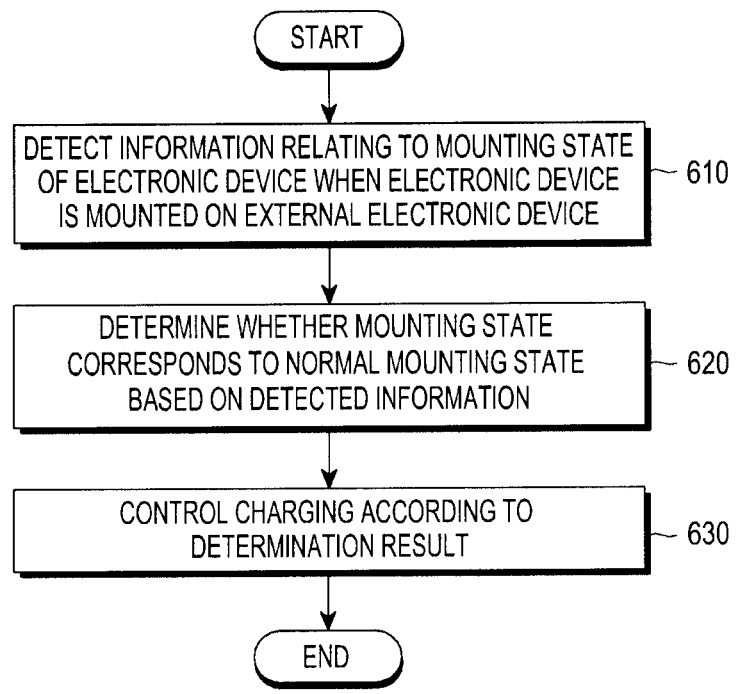
FIG. 6 is a flowchart of an example of a process, according to an embodiment of the present disclosure.

FIG. 6 is a flowchart of an example of a process, according to an embodiment of the present disclosure. The method for wireless charging in an electronic device, according to the embodiment of the present disclosure, may include operations 610, 620, and 630. The method for wireless charging in an electronic device may be performed by at least one of the electronic device 500, the processor of the electronic device (e.g., the processors 120 and 210 of the electronic devices 101 and 201), and the controller of the electronic device (e.g., the control circuit 512).

In operation 610, for example, when the electronic device is mounted on an external electronic device (e.g., the external electronic device 550), the electronic device may detect information relating to the mounting state of the electronic device through the sensing circuit 514.

According to an embodiment, the detected information may include at least one of an indication of the mounting angle of the electronic device and an indication of the magnetic intensity corresponding to at least one magnetic element 400M.

In operation 620, for example, the electronic device may determine whether it is in a normal mounting state based on the detected information.

According to an embodiment, when the detected mounting angle matches a preset reference mounting angle, the electronic device may determine that its mounting state is a normal mounting state. According to aspects of the disclosure, the detected mounting angle may match the preset reference mounting angle when the detected mounting angle is equal to the preset reference mounting angle and/or when the detected mounting angle is within a predetermined distance from the reference mounting angle.

Additionally or alternatively, when the detected magnetic intensity of the at least one magnetic element 400M matches a preset reference magnetic intensity, the electronic device may determine that its mounting state is a normal mounting state. According to aspects of the disclosure, the detected magnetic intensity may match the preset reference magnetic intensity when the detected magnetic intensity is equal to the preset reference magnetic intensity and/or when the detected magnetic intensity is within a predetermined distance from the reference magnetic intensity.

For example, the normal mounting state may be a state in which the conductive coil 511L of the electronic device and the conductive coil 551L of the external electronic device 550 are aligned with each other in the range in which charging efficiency is normal. For example, the electronic device may set, in advance, the mounting angle corresponding to the normal charging efficiency to the reference mounting angle. Furthermore, the electronic device may set, in advance, the magnetic intensity of one or more magnetic elements (e.g., the magnetic elements 400M and 450M) that are formed in a position corresponding to the normal charging efficiency to correspond to the electronic device and the external electronic device 550 to the reference magnetic intensity.

In operation 630, for example, the electronic device may control a charging operation according to whether the electronic device is in a normal mounting state. For example, the electronic device may charge its battery by using power received from the external electronic device when the electronic device is in the normal mounting state.

According to an embodiment, when the determination result shows that the electronic device is in a normal mounting state, the electronic device may receive the power corresponding to the normal mounting state from the external electronic device 550 and perform the charging operation.

According to an embodiment, when the determination result shows that the electronic device is in an abnormal mounting state, the electronic device may transmit a charging end signal to the external electronic device 550 and end the charging operation.

According to an embodiment, when the determination result shows that the electronic device is in an abnormal mounting state, the electronic device may output an indication that the electronic device is in the abnormal mounting state. For example, the electronic device may provide, to a user, at least one of visual, auditory, and tactile indication that the electronic device is in the abnormal mounting state. The visual indication may include at least one of a text, a figure, a character, a sign, and a color that are displayed through a display device (e.g., the display device 515). The auditory indication may include at least one of a voice, a message, an alert sound, and a sound that are output through an audio module (e.g., the audio module 280). The tactile indication may include a vibration generated by an actuating device.

Figure 7:
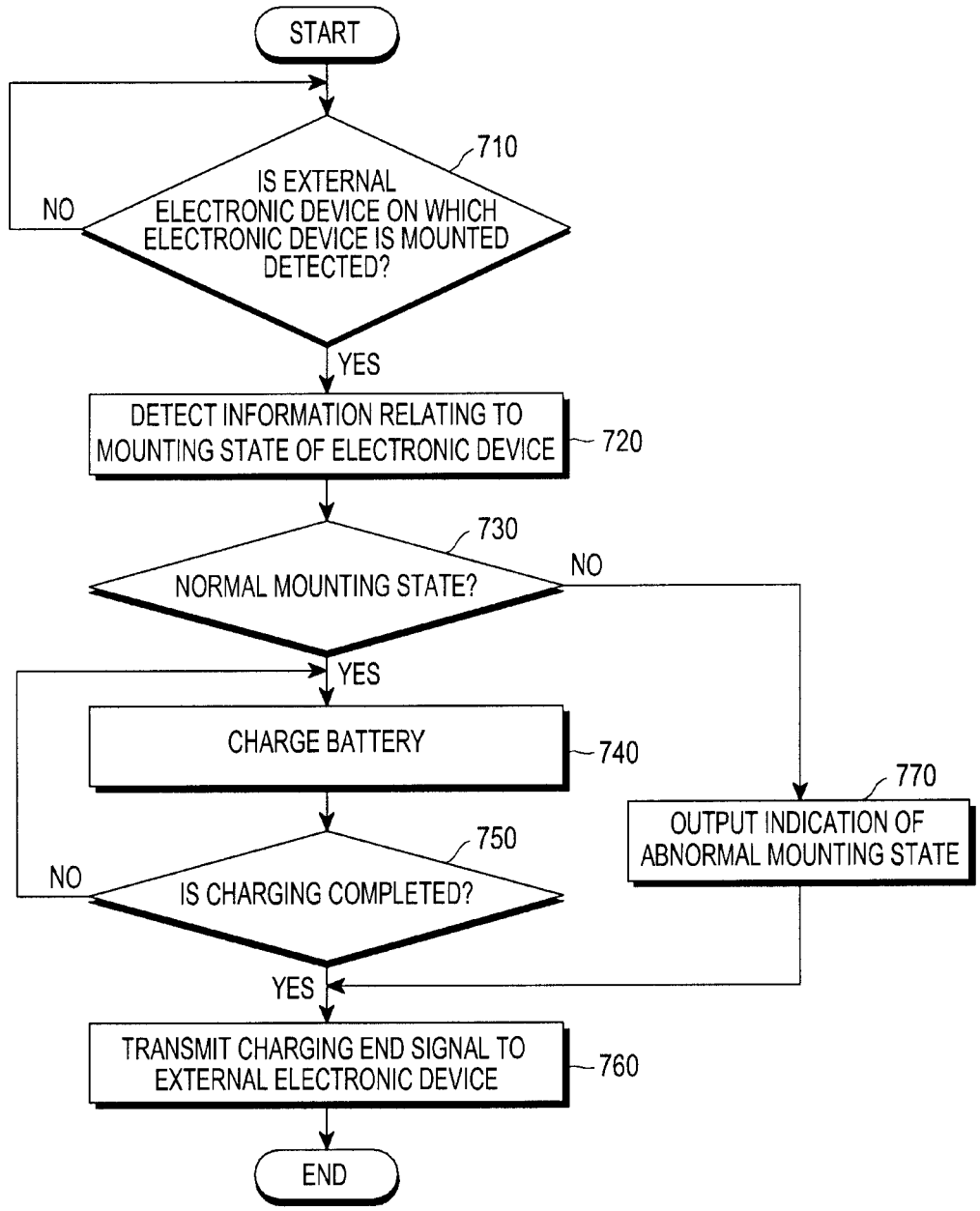
FIG. 7 is a flowchart of an example of a process, according to an embodiment of the present disclosure.

According to an embodiment, when the determination result shows that the electronic device is in an abnormal mounting state, the electronic device may perform charging with power corresponding to a preset current value. The preset current value may be set to a current value that is less than, or equal to, a current value that corresponds to the amount of power that is received in the abnormal mounting state. For example, when the received power in the abnormal mounting state is 150 kW, in order to limit the received power to a predetermined power, i.e., 75 kW, the preset current value may be set to a current value that corresponds to the limited power. FIG. 7 is a flowchart of an example of a process, according to an embodiment of the present disclosure. The method for wireless charging in an electronic device, according to the embodiment of the present disclosure, may include operations 710 to 770. The method for wireless charging in an electronic device may be performed by at least one of the electronic device 500, the processor of the electronic device (e.g., the processors 120 and 210 of the electronic devices 101 and 201), and the controller of the electronic device (e.g., the control circuit 512).

In operation 710, the electronic device may determine whether an external electronic device (e.g., the external electronic device 550) on which the electronic device may be mounted is detected. The electronic device may perform operation 720 when the external electronic device 550 is detected and may repeat operation 710 when the external electronic device is not detected.

According to an embodiment, the electronic device may detect the external electronic device by detecting a change in the current and/or voltage applied to the conductive coil

511L. For example, when the change in the current and/or voltage value applied to the conductive coil 511L is greater than, or equal to, a reference value, the electronic device may determine that the electronic device is adjacent to the external electronic device 550. In another embodiment, when the change in the current and/or voltage value applied to the conductive coil 511L of the electronic device indicates that the electronic device is being supplied with power by the external electronic device, the electronic device may determine that the electronic device is adjacent to the external electronic device.

In operation 720, for example, the electronic device may detect information relating to the mounting state of the electronic device.

According to an embodiment, the detected information may include at least one of an indication of the mounting angle detected by the sensing circuit 514 of the electronic device and/or an indication of the magnetic intensity corresponding to one or more magnetic elements 400M of the electronic device.

In operation 730, for example, the electronic device may determine whether the electronic device is in a normal mounting state based on the detected information. The electronic device may perform operation 740 when it is determined that the electronic device is in the normal mounting state. By contrast, the electronic device may perform operation 770 when it is determined that the electronic device is in an abnormal mounting state.

According to an embodiment, when the detected mounting angle matches a preset reference mounting angle, the electronic device may determine that it is in a normal mounting state.

According to an embodiment, when the detected magnetic intensity of the one or more magnetic elements 400M matches a preset reference magnetic intensity, the electronic device may determine that it is in a normal mounting state.

For example, the normal mounting state may be a state in which the conductive coil 511L of the electronic device and the conductive coil 551L of the external electronic device 550 are aligned with each other in the range in which charging efficiency is normal. For example, the electronic device may set, in advance, the mounting angle corresponding to the normal charging efficiency to the reference mounting angle. Furthermore, the electronic device may set, in advance, the magnetic intensity of one or more magnetic elements (e.g., the magnetic elements 400M and 450M) that are formed in a position corresponding to the normal charging efficiency to correspond to the electronic device and the external electronic device 550 to the reference magnetic intensity.

In operation 740, for example, the electronic device may receive the power corresponding to the normal mounting state from the external electronic device 550 and perform charging.

In operation 750, for example, the electronic device may determine whether the electronic device is completely recharged (e.g., determine whether the battery of the electronic device is charged beyond a predetermined level). The electronic device may perform operation 760 when the electronic device is completely recharged and may repeat operation 740 when the electronic device is not completely charged.

In operation 760, for example, the electronic device may transmit a charging end signal to the external electronic device 550 and end the charging.

In operation 770, for example, the electronic device may output an indication that the electronic device is in the abnormal mounting state.

According to an embodiment, the electronic device may output at least one of visual, auditory, and tactile indication that the electronic device is in the abnormal mounting state. The visual indication may include at least one of a text, a figure, a character, a sign, and a color that are displayed through a display device (e.g., the display device 515). The auditory indication may include at least one of a voice, a message, an alert sound, and a sound that are output through an audio module (e.g., the audio module 280). The tactile indication may include a vibration generated by an actuating device.

Figure 8:
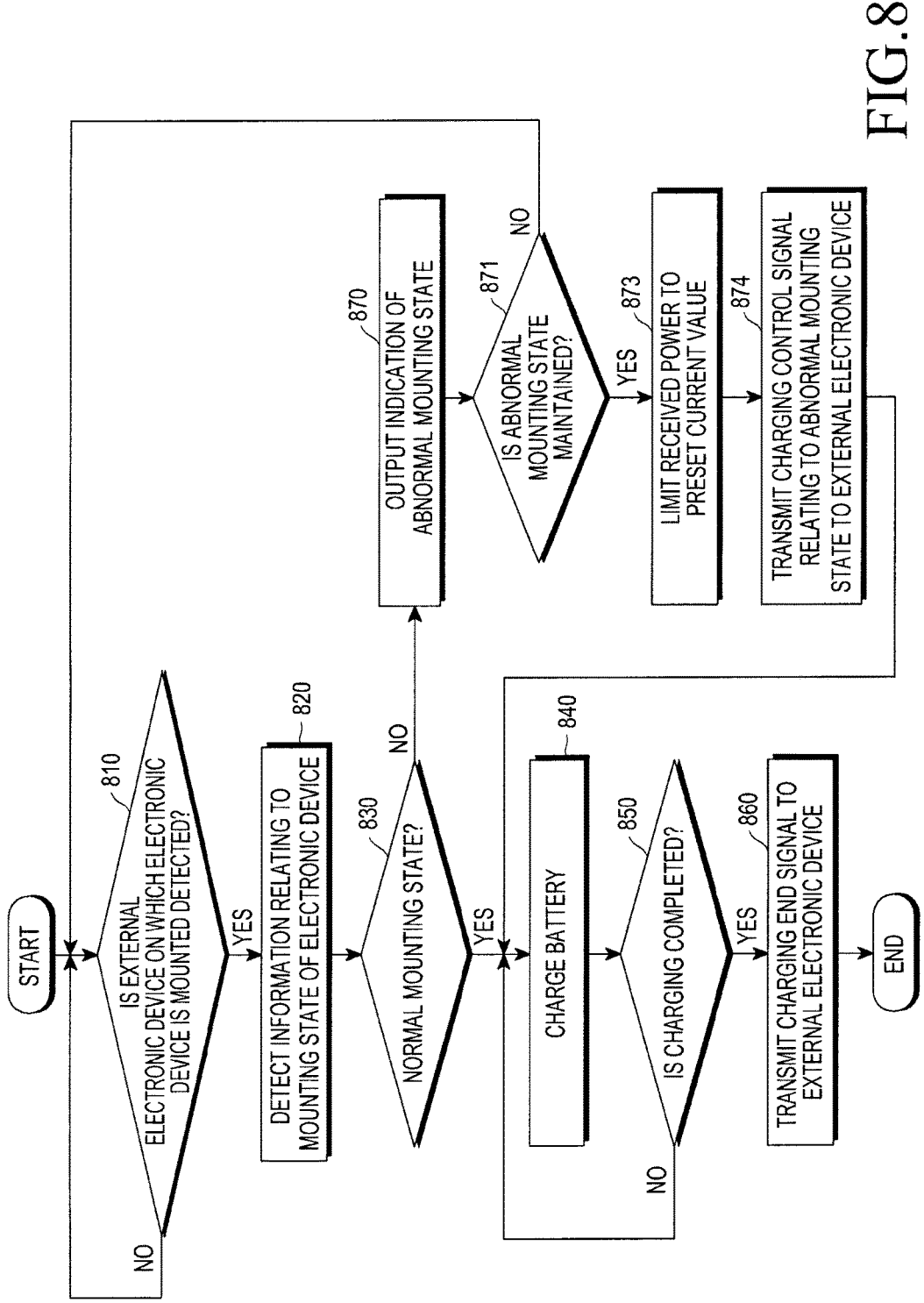
FIG. 8 is a flowchart of an example of a process, according to an embodiment of the present disclosure.

FIG. 8 is a flowchart of an example of a process, according to an embodiment of the present disclosure. The method for wireless charging in an electronic device, according to the embodiment of the present disclosure, may include operations 810 to 874. The method for wireless charging in an electronic device may be performed by at least one of the electronic device 500, the processor of the electronic device (e.g., the processors 120 and 210 of the electronic devices 101 and 201), and the controller of the electronic device (e.g., the control circuit 512).

Operations 810 to 870 may be performed in the same or similar manner as operations 710 to 770 of FIG. 7.

In operation 871, the electronic device may determine whether the abnormal mounting state is maintained. For example, the electronic device may determine whether it remains in the abnormal mounting state for a predetermined time period. The electronic device may perform operation 873 when the abnormal mounting state is maintained and may repeat operation 810 when the electronic device is not maintained in the abnormal mounting state.

In operation 873, the electronic device may limit the received power in accordance with a preset current value.

According to an embodiment, the preset current value may be set to a current value that is less than, or equal to, a current value that corresponds to the amount of power that is received in the abnormal mounting state. For example, when the received power in the abnormal mounting state is 150 kW, in order to limit the received power to a predetermined power, i.e., 75 kW, the preset current value may be set to a current value that corresponds to the limited power. In operation 874, for example, the electronic device may transmit a charging control signal relating to the abnormal mounting state to the external electronic device 550.

According to an embodiment, the charging control signal may have power that is limited to correspond to the preset current value in operation 873. In response to the control signal, the external electronic device 550 may begin transmitting, to the electronic device, the power that corresponds to the limited power that is included in the charging control signal.

Figure 9:
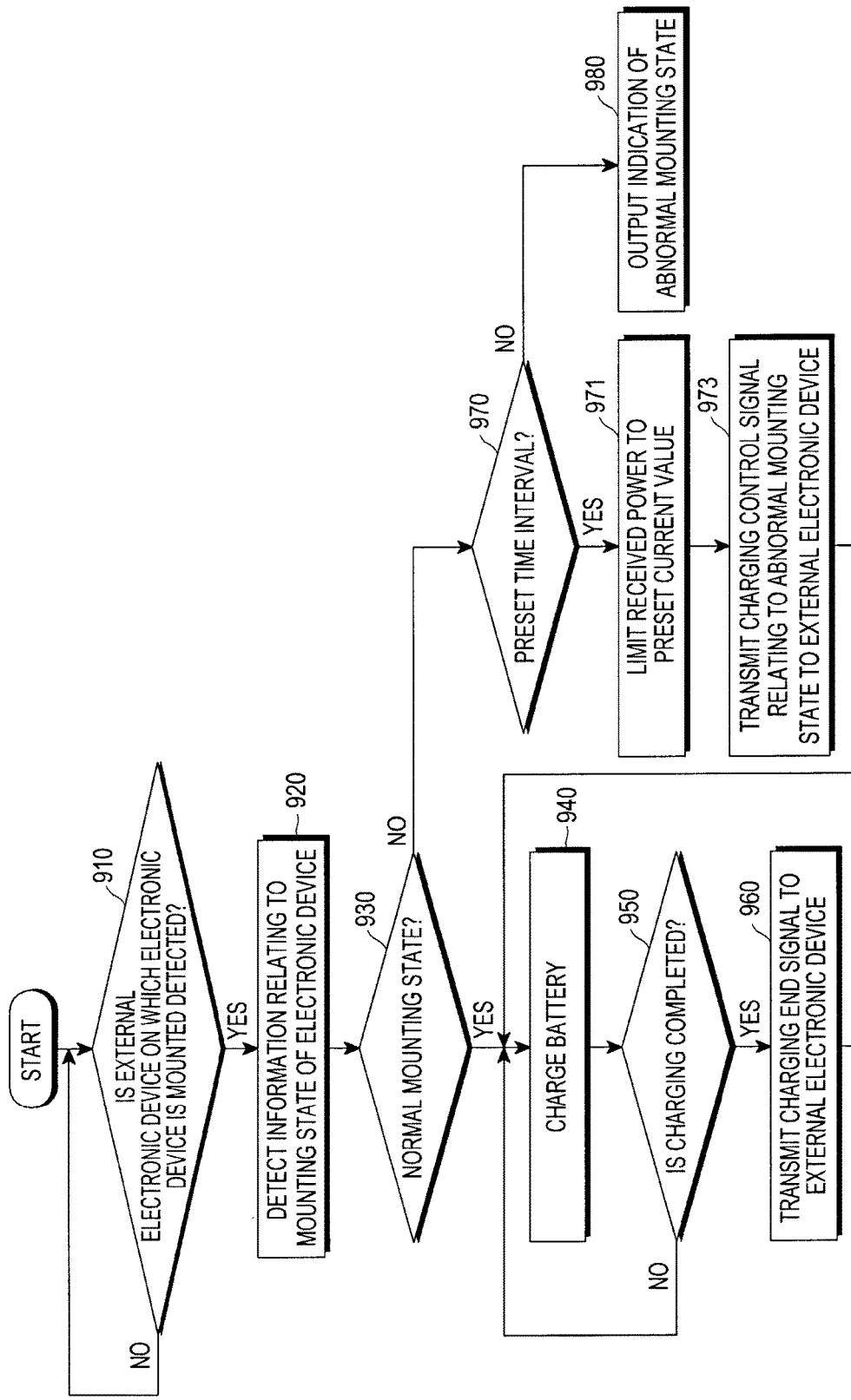
FIG. 9 is a flowchart of an example of a process, according to an embodiment of the present disclosure.

FIG. 9 is a flowchart of an example of a process, according to an embodiment of the present disclosure. The method for wireless charging in an electronic device, according to the embodiment of the present disclosure, may include operations 910 to 980. The method for wireless charging in an electronic device may be performed by at least one of the electronic device 500, the processor of the electronic device (e.g., the processors 120 and 210 of the electronic devices 101 and 201), and the controller of the electronic device (e.g., the control circuit 512).

Operations 910 to 960 may be performed in the same or similar manner as operations 710 to 760 of FIG. 7, a detailed description thereof will be replaced with the above description.

In operation 970, for example, the electronic device may determine whether the electronic device is in the abnormal mounting state during a preset time interval. The electronic device may perform operation 971 when it is detected that the electronic device is in the abnormal mounting state during the preset time interval. By contrast, the electronic device may perform operation 980 when it is detected that the electronic device is not in the abnormal mounting state during the preset time interval.

According to an embodiment, the preset time interval may be set by a user in advance. For example, the preset time interval may be set to a specific time interval, such as a sleeping time. Thus, the preset time interval, may be specified via user input that is entered into the electronic device.

In operation 971, for example, the electronic device may limit the received power to in accordance with a preset current value.

According to an embodiment, the preset current value may be set to a current value that is less than, or equal to, a current value that corresponds to the amount of power that is received in the abnormal mounting state. For example, when the received power in the abnormal mounting state is 150 kW, in order to limit the received power to a predetermined power, i.e., 75 kW, the preset current value may be set to a current value that corresponds to the limited power. In operation 973, for example, the electronic device may transmit a charging control signal relating to the abnormal mounting state to the external electronic device 550.

According to an embodiment, the charging control signal may include the power that is limited to correspond to the preset current value in operation 873. The external electronic device 550 may transmit, to the electronic device, the power that corresponds to the limited power that is included in the charging control signal.

In operation 980, for example, the electronic device may output an indication that the abnormal mounting state.

According to an embodiment, the electronic device may provide, to a user, at least one of visual, auditory, and tactile data for representing that the mounting state of the electronic device corresponds to the abnormal mounting state. The visual data may include at least one of a text, a figure, a character, a sign, and a color that are displayed through a display device (e.g., the display device 515). The auditory data may include at least one of a voice, a message, an alert sound, and a sound that are output through an audio module (e.g., the audio module 280). The tactile data may include a vibration generated by an actuating device.

According to various embodiments, a method for wireless charging in an electronic device may include: when the electronic device is mounted on an external electronic device, detecting information relating to the mounting state of the electronic device; determining whether the mounting state corresponds to a normal mounting state based on the detected information; and controlling the execution of charging according to the determination result.

According to various embodiments, the detected information may include the mounting angle of the electronic device.

According to various embodiments, determining whether the mounting state corresponds to a normal mounting state may include determining the mounting state of the electronic device to be a normal mounting state when the detected mounting angle of the electronic device corresponds to a preset reference mounting angle.

According to various embodiments, controlling the execution of charging may include receiving the power from the external electronic device to perform charging when the mounting state of the electronic device corresponds to a normal mounting state.

According to various embodiments, determining whether the mounting state corresponds to a normal mounting state may include determining the mounting state of the electronic device to be an abnormal mounting state when the detected mounting angle of the electronic device does not correspond to a preset reference mounting angle.

According to various embodiments, controlling the execution of charging may include transmitting a charging end signal to the external electronic device to end the charging when the mounting state of the electronic device corresponds to an abnormal mounting state.

According to various embodiments, controlling the execution of charging may include informing that the mounting state corresponds to an abnormal mounting state when the mounting state of the electronic device corresponds to the abnormal mounting state.

According to various embodiments, controlling the execution of charging may include limiting the received power to power corresponding to a preset current value to perform charging when the mounting state of the electronic device corresponds to an abnormal mounting state.

According to various embodiments, controlling the execution of charging may include determining whether the time detected when the mounting state of the electronic device is determined to be an abnormal mounting state corresponds to a preset time interval when the mounting state of the electronic device corresponds to the abnormal mounting state.

According to various embodiments, controlling the execution of charging may include limiting the received power to power corresponding to a preset current value to perform charging when the detected time corresponds to the preset time interval.

According to various embodiments, controlling the execution of charging may include, when the mounting state of the electronic device corresponds to an abnormal mounting state, determining whether the abnormal mounting state is maintained.

According to various embodiments, controlling the execution of charging may include limiting the received power to power corresponding to a preset current value to perform charging when the abnormal mounting state is maintained.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments, provided is a recording medium having instructions stored therein. The instructions are set to make at least one processor perform at least one operation when the instructions are executed by the at least one processor, in which the at least one operation may include: when the electronic device is mounted on an external electronic device, detecting information relating to the mounting state of the electronic device; determining whether the mounting state corresponds to a normal mounting state based on the detected information; and controlling the execution of charging according to the determination result.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

What is claimed is:

1. An electronic device comprising:
   a sensing circuit; and
   a communication interface; and
   at least one processor operatively coupled to the sensing circuit and the communication interface, configured to:
   receive, from an external device, switch operation information associated with an operation of a switch included in the external device via the communication interface, wherein the switch is pressed by the electronic device when the electronic device is mounted on the external device;
   identify a mounting state of the electronic device based on the switch operation information; and
   perform a charging operation based on the mounting state of the electronic device.

2. The electronic device of claim 1, wherein the processor is configured to identify that the electronic device is in a normal mounting state when the switch operation information includes information indicating that the switch has been pressed.

3. The electronic device of claim 2, wherein the processor is configured to perform the charging operation by using power received from the external device when the electronic device is in the normal mounting state.

4. The electronic device of claim 1, wherein the processor is configured to identify that the electronic device is in an abnormal mounting state when the switch operation information includes information indicating that the switch has been un-pressed.

5. The electronic device of claim 4, wherein the processor is configured to transmit a charging end signal to the external device in response to detecting that the electronic device is in the abnormal mounting state.

6. The electronic device of claim 4, wherein the processor is configured to output an indication that the electronic device is in the abnormal mounting state when the electronic device is in the abnormal mounting state.

7. The electronic device of claim 4, wherein the processor is configured to limit power received from the external device in response to identifying that the electronic device is in the abnormal mounting state.

8. The electronic device of claim 4, wherein the processor is configured to identify whether the electronic device is in the abnormal mounting state during a predetermined time period.

9. The electronic device of claim 8, wherein the processor is configured to: limit power received from the external device based on a preset current value in response to identifying that the electronic device is in the abnormal mounting state during the predetermined time period.

10. The electronic device of claim 4, wherein the processor is configured to identifying whether the electronic device remains in the abnormal mounting state for a predetermined time period.

11. The electronic device of claim 10, wherein the processor is configured to limit power received from the external device based on a preset current value in response to identifying that the electronic device remains in the abnormal mounting state for the predetermined time period.

12. A method for wireless charging of an electronic device, comprising:
receiving, from an external device, switch operation information associated with an operation of a switch included in the external device, wherein the switch is pressed by the electronic device when the electronic device is mounted on the external device;
identifying the mounting state of the electronic device based on the switch operation information; and
performing a charging operation based on the mounting state of the electronic device.

13. The method of claim 12, wherein identifying the mounting state of the electronic device comprises identifying that the electronic device is in a normal mounting state when the switch operation information includes information indicating that the switch has been pressed.

14. The method of claim 13, wherein performing the charging operation comprises performing the charging operation by using power received from the external device when the electronic device is in the normal mounting state.

15. The method of claim 12, wherein identifying the mounting state of the electronic device includes identifying that the electronic device is in an abnormal mounting state when the switch operation information includes information indicating that the switch has been un-pressed.

16. The method of claim 15, further comprising transmitting a charging end signal to the external device in response to identifying that the electronic device is in the abnormal mounting state.

17. The method of claim 15, further comprising outputting an indication that the electronic device is in the abnormal mounting state when the electronic device is in the abnormal mounting state.

18. The method of claim 15, wherein performing the charging operation comprises limiting power received from the external device based on a preset current value in response to identifying the electronic device is in the abnormal mounting state.

19. An electronic device comprising:
a housing including a recess that is arranged to accommodate at least a part of an external electronic device;
a conductive pattern disposed adjacently to a first surface of the recess that is oriented towards the external electronic device when the external electronic device is received in the recess;
a wireless charging transmission circuit that is electrically coupled to the conductive pattern;
an interface circuit that is electrically be coupled to the wireless charging transmission circuit;
a communication interface; and
at least one processor configured to:
identifying whether a switch is pressed by the external electronic device arranged on the recess including the switch; and
transmit switch operation information association with an operation of the switch on based on a result of the identification;
receive a control signal according to the switch operation information from the external electronic device and cause the wireless charging transmission circuit to charge the external electronic device based on the control signal.

* * * * *